United States Patent

Bolton et al.

Patent Number: 5,163,716
Date of Patent: Nov. 17, 1992

[54] CONDENSER CONNECTOR ASSEMBLY FOR CONNECTING REFRIGERANT LINE

[75] Inventors: James D. Bolton, Lancaster; Robert C. Gmerek, Wilson, both of N.Y.

[73] Assignee: General Motors Corporation, Detroit, Mich.

[21] Appl. No.: 783,037

[22] Filed: Oct. 25, 1991

[51] Int. Cl.⁵ .............................. F16L 19/00
[52] U.S. Cl. .................. 285/158; 285/159; 285/161; 285/211; 285/924; 62/299; 165/173
[58] Field of Search ............. 285/158, 159, 161, 211, 285/924; 62/299 X, 298; 165/178, 173 X

[56] References Cited

U.S. PATENT DOCUMENTS

| 703,177 | 6/1902 | Buffum | 165/178 |
|---|---|---|---|
| 2,750,760 | 6/1956 | Kaufman | 62/299 |
| 3,001,804 | 9/1964 | Tomlinson | 285/159 |
| 3,125,361 | 2/1961 | Weaver | 285/159 X |
| 4,225,161 | 9/1980 | Smith | 285/159 |
| 4,257,748 | 3/1981 | Ives et al. | 285/161 X |
| 4,448,447 | 5/1984 | Funk et al. | 285/4 |
| 4,626,006 | 12/1986 | Noguchi et al. | 285/158 |
| 4,640,535 | 2/1987 | Hermann | 285/161 X |
| 4,672,728 | 6/1987 | Nimberger | 285/161 X |

FOREIGN PATENT DOCUMENTS 568118  8/1960  Belgium ............... 285/159

Primary Examiner—Randolph A. Reese
Assistant Examiner—Timothy Aberle
Attorney, Agent, or Firm—Ronald L. Phillips

[57] ABSTRACT

A connector assembly includes a connecting block and mating adapter for attaching an automotive refrigerant line to a condenser tank. A port/passageway is provided within the connecting block to receive a nipple on the adapter for communicating fluid from the refrigerant line to the condenser tank. The connecting block is securely welded or brazed to the side wall of the condenser tank providing a secure, leak-proof joint. A retaining bolt securely maintains the connection of the adapter to the connecting block.

3 Claims, 1 Drawing Sheet

CONDENSER CONNECTOR ASSEMBLY FOR CONNECTING REFRIGERANT LINE

TECHNICAL FIELD

This invention relates to fluid component connections for vehicle air conditioning systems, and more particularly, to an assembly designed for making a more efficient and reliable connection between a refrigerant line and a condenser tank.

BACKGROUND OF THE INVENTION

A typical prior art arrangement for connecting a refrigerant line to the condenser tank of a vehicle air conditioning system is accomplished by, first, welding or brazing a short section of tubing, bent so as to fit on the side of the condenser tank. A triangular bracket is attached to the condenser tank, requiring at least two fasteners to provide a sturdy mount. Next, a clamp is installed around the free end of the tubing and anchored to the bracket by a third fastener. Finally, the tubing is connected to the refrigerant line coming from the compressor of the air conditioning system or going to the evaporator inside the vehicle. This connection is secured by tightening the fitting between the end of the refrigerant line and the tubing.

While providing an effective means for connection, several disadvantages are inherent in this type of prior art arrangement. First, this assembly requires an excessive number of parts. A minimum of three fasteners is required to securely support the connection point of the refrigerant line. Additional mounting components, including the triangular bracket and the complete fitting for the tubing are also required. Thus, due to this relatively large number of component parts, this assembly suffers from relatively high material and manufacturing costs. Second, significant installation time is required to position the component parts and secure them with the fasteners. Hence, the prior art assembly also suffers from relatively high labor assembly costs.

A third disadvantage arises from the need to maintain close tolerances in the individual component parts such as the short section of tubing. If the tubing is not bent at just the right angle the welded or brazed joints may be stressed. When subjected to vehicle vibrations, the joint is then susceptible to loosening, and eventually fatigue failure. Failure of such a joint leads directly to a loss of refrigerant, and thus the air conditioning system becomes inoperative. Accordingly, a need clearly exists for an improved connector assembly.

SUMMARY OF THE INVENTION

It is accordingly a primary object of the present invention to provide an assembly for connecting a refrigerant line to a condenser overcoming the above-described limitations and disadvantages of the prior art.

A more specific object is to provide an assembly that reduces the number of parts required to make the connection, thereby reducing both material and labor costs of production.

Still another object of the present invention is to provide a simplified assembly for more rigidly connecting a vehicular refrigerant line to the condenser tank that reduces manufacturing variances and promotes improvements in the quality and reliability of the connection.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, the connector assembly of the present invention is suited for the efficient connection of a refrigerant line to the condenser tank of a vehicular air conditioning system. The assembly includes a connecting block that communicates with the condenser tank. The block has an internal passageway providing direct fluid connection with either an inlet or outlet port in the condenser tank. Preferably, the connecting block is welded or brazed to a substantial portion of the sidewall of the condenser tank around the port. Additionally, it is preferred that the connecting block include a protruding tap that is tightly received within the port in the wall of the condenser tank. Together, the relatively large surface area of the weld and the engagement of the tubular tap in the port provide a very rigid connection that does not loosen or fatigue even when subjected to vehicle vibrations over extended periods of time.

The assembly also includes a unique fitting that receives the end of the refrigerant line, and acts as a mating adapter between the refrigerant line and the connecting block. The adapter includes an integral nipple that fits directly in the flow passageway of the connecting block. Additionally, the assembly provides an anchoring means, that may be realized, for example, by a retaining bolt extending through the adapter to the connecting block.

Installation and connection of the assembly is achieved by first attaching the connecting block to the side of the condenser tank. The protruding tap allows easy location of the connection point. The joint between the connecting block and the condenser tank is then welded or brazed about its entire periphery. Next, the refrigerant line adapter is attached to the end of the refrigerant line. The integral nipple on the adapter is then inserted into the receiving port of the internal flow passageway of the block. Installation is completed by simply inserting the single retaining bolt through the adapter and tightening the bolt into the mating threaded hole of the block.

Due to the reduction in the number of fasteners and other mounting components required, the installation time of the present apparatus is greatly reduced. Additionally, because of the large area of contact between the connecting block and the condenser tank, the present invention provides a more secure coupling between the condenser tank and the refrigerant line. As a result, the integrity of the joint is enhanced and the probability of a leak developing in response to vibrations from normal vehicle operation is significantly reduced. This improved reliability translates directly into increased customer satisfaction.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
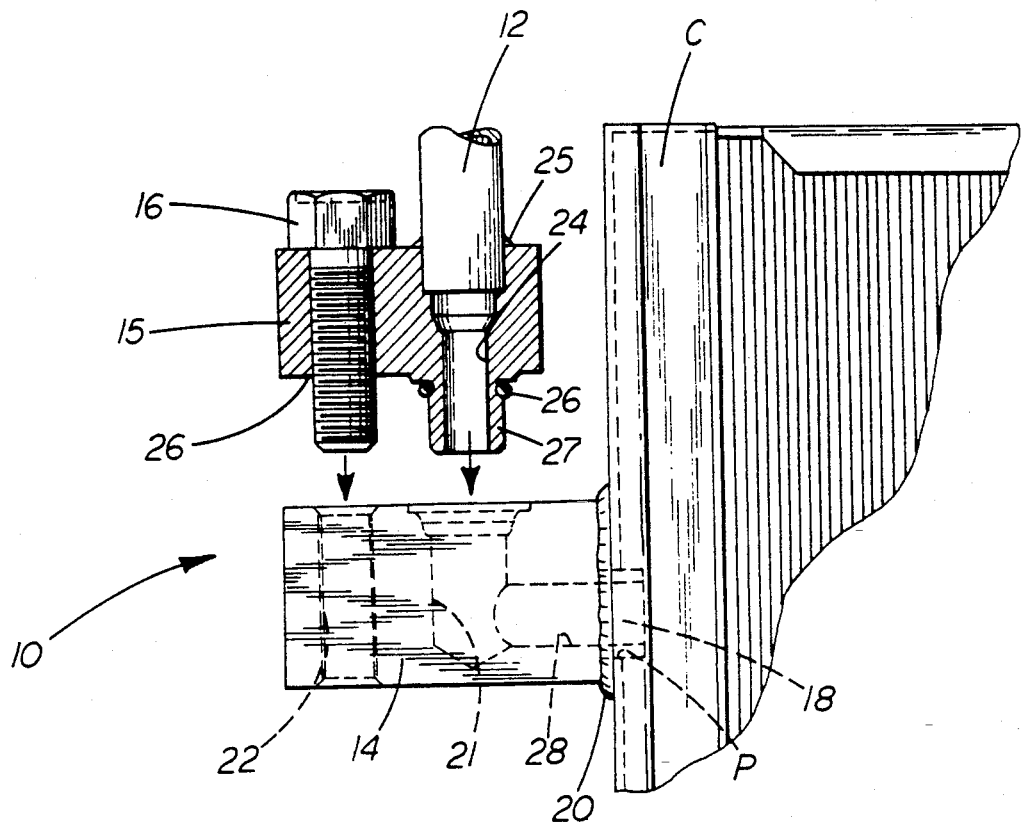
FIG. 1 is a partial cross sectional front elevational view of the connector assembly of the invention showing the condenser and attached connecting block, with the refrigerant line and adapter ready to be attached.
Figure 2:
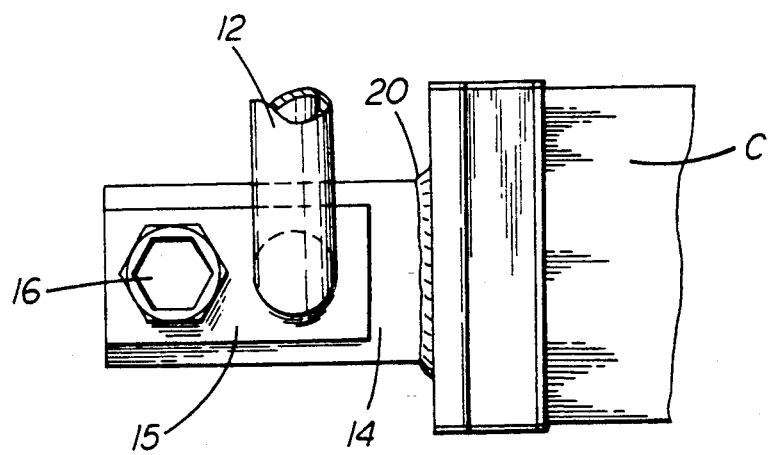
FIG. 2 is a top plan view of the connector assembly of the invention showing the relative positioning of the adapter on the connecting block.

Reference is now made to FIG. 1 showing an assembly, generally designated by reference numeral 10, for connecting an automotive refrigerant line 12 to the condenser tank C. The assembly 10 includes a one-piece connecting block 14, machined from an appropriate metal material, that is attached to the sidewall of the condenser tank C. Preferably, the condenser tank C is extruded and fabricated from an appropriate metal in a manner known in the art, to provide a flat end face surface upon which to register and secure the block 14.

A refrigerant line adapter 15 receives the refrigerant line 12. The adapter 15 is designed to mate with the connecting block 14. A retaining bolt 16 secures the adapter 15 in position to complete the connection.

More particularly, the connecting block 14 includes an integral protruding tap 18. The protruding tap 18 is received in port P of the condenser tank C so as to provide snug engagement. This snug engagement aids in properly locating and orienting the connecting block 14 during installation.

Once located, the connecting block 14 is attached to the condenser tank C by a weld or braze joint 20. By welding or brazing the entire perimeter of the connecting block/condenser tank joint 20, a sturdier, more rigid connection is realized. The combination of the extensive weld or braze joint 20 and snug fit of the tap 18 in the port P of the condenser tank C, serves to resist the forces applied to the connecting block 14 during assembly including tightening of the retaining bolt 16. Further, the strength of the joint 20 is sufficient to resist fatigue failure resulting from vibrations to which the connection is continually subjected during vehicle operation. Thus, the quality and reliability of the connection provided by the assembly 10 is improved significantly.

The connecting block 14 is adapted to receive the adapter 15 by a fluid receiving port and internal passageway 21 and a threaded anchoring bore 22. The receiving port/passageway 21 communicates with a right angle internal flow passageway 28. The passageway 28 runs through the connecting block 14 and the tap 18 so as to communicate at the opposite end with the condenser tank C.

The refrigerant line adapter 15 connects to the end of the refrigerant line 12, and thus makes the connection along passage 24 between the refrigerant line 12 and the receiving port/passageway 21 of the connecting block 14. The adapter 15 is welded at 25 to the end of the refrigerant line 12, whereby a permanent connection is realized. The weld joint 25 provides a strong and a leak-proof connection between the two components.

The adapter 15 includes an integral nipple 27 forming the end of the passage 24. This nipple 27 projects into the receiving port/passageway 21 of the connecting block 14 and functions as an adaptive 15 coupling between the two components. Fluid leakage at this connection joint is prevented by the inclusion of an O-ring 26 that encircles the nipple 27 and seats against the inner wall of the receiving port/passageway 21.

It is readily observed, from the above-described preferred embodiment, that the installation of the present invention is greatly simplified over the prior method. First, the protruding tap 18 of the connecting block 14 is positioned in the port P of the condenser tank C. The weld or braze 20 is then made around the entire joint between the connecting block 14 and the wall of the condenser tank C. Next, the refrigerant line 12 is inserted into the adapter 15, and the weld joint 25 is made to secure these components together. The adapter nipple 27 is then inserted and seated in the receiving port/passageway 21 of the connecting block 14. Finally, the retaining bolt 16 is inserted into and securely tightened in the anchoring bore 22 in the connecting block 14. Accordingly, installation is quickly and efficiently completed by simply tightening a single fastener.

In summary, numerous benefits result from employing the concepts of the present invention. The assembly 10 provides a simplified construction with reduced material costs. Installation labor costs are also reduced. The large area weld 20 and snug fit of the tap 18 in the port P of the condenser tank C function to provide a high strength connection. This connection readily withstands the forces applied to the connecting block 14 during installation, as well as the vibrations from vehicle operation without loosening or suffering fatigue failure. Hence, leaks and associated repairs are substantially avoided.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. An assembly for connecting an automotive refrigerant line to a refrigerant port of a condenser tank, comprising:
   a connecting block attached to said condenser tank, said connecting block including an integral tap that projects into said refrigerant port and a passageway for providing fluid communication through said connecting block and tap between said refrigerant line and said refrigerant port;

adapter means for coupling an end of said refrigerant line to said connecting block;

nipple means integral with said adapter means for sealing between said adapter means and said connecting block; and means for securing said adapter means to said connecting block.

2. An assembly for connecting an automotive refrigerant line to a refrigerant port of a condenser tank, comprising:

a connecting block secured by a weld bead to a sidewall of said condenser tank bout said port, said connecting block including an integral tap that projects into said port and a passageway running through said block and said tap for providing fluid communication between said refrigerant line and said refrigerant port;

adapter means for coupling an end of said refrigerant line to said connecting block;

nipple means integral with said adapter means for sealing between said adapter means and said connecting block; and anchoring means for securing said adapter means and said refrigerant line to said connecting block.

3. The assembly as set forth in claim 2 wherein said integral tap is dimensionally nominally equal to said refrigerant port so as to allow insertion through said port from outside said condenser tank and provide a snug engagement in said port.

* * * * *